United States Patent [19]

Shirasaki

[11] Patent Number: 4,970,182

[45] Date of Patent: Nov. 13, 1990

[54] METHOD FOR PRODUCING MULTI-COMPONENT CERAMICS

[75] Inventor: Shin-ichi Shirasaki, Tsukuba, Japan

[73] Assignees: Nippondenso Co., Ltd., Kariya; Science and Technology Agency National Institute for Research in Inorganic Materials, Tsukuba, both of Japan

[21] Appl. No.: 364,498

[22] Filed: Jun. 9, 1989

[30] Foreign Application Priority Data

Dec. 17, 1986 [JP] Japan ................................ 61-300745

[51] Int. Cl.$^5$ ...................... C04B 35/49; C01G 21.02
[52] U.S. Cl. ................................. 501/134; 252/62.9; 423/598; 423/619
[58] Field of Search ...................... 501/134; 252/62.9; 423/598, 594, 608, 619

[56] References Cited

U.S. PATENT DOCUMENTS

| | | | |
|---|---|---|---|
| 3,963,630 | 6/1976 | Yonezawa et al. | 423/598 X |
| 4,587,225 | 5/1986 | Tsukuma et al. | 501/105 O R |
| 4,643,984 | 2/1987 | Abe et al. | 252/62.9 X |
| 4,696,810 | 9/1987 | Shirasaki et al. | 423/598 X |
| 4,812,426 | 3/1989 | Takagi et al. | 501/134 X |

FOREIGN PATENT DOCUMENTS

| | | | |
|---|---|---|---|
| 0051664 | 3/1985 | Japan | 501/134 |
| 61-53114 | 3/1986 | Japan . | |
| 1111918 | 5/1986 | Japan | 501/134 |
| 62-191465 | 8/1987 | Japan . | |
| 0829603 | 5/1981 | U.S.S.R. | 501/134 |

OTHER PUBLICATIONS

Journal of the American Ceramic Society, Nov. 1972, pp. 541–544, vol. 55, No. 11.

Primary Examiner—Karl Group
Attorney, Agent, or Firm—Cushman, Darby & Cushman

[57] ABSTRACT

Aqueous titanium tetrachloride solution, i.e., one component (X) for forming multi-component ceramic compound, and a suitable amount of zirconium oxynitrate, i.e., another component (Y) are mixed. Hydroxide coprecipitate of $Ti^{4+}$ and $Zr^{4+}$ containing the components is formed from the mixture solution. The coprecipitate is cleaned, dried, then calcined, for example, at 1100° C., thus producing powder containing 0.32-micron particles. This powder is mixed with $TiO_2$ and PbO, in a suitable amount to be added to the other component (Y) of the multi-component ceramic compound. The resultant mixture is calcined, for example, at 740° for 1 hour, into fine powder containing 0.32-micron particles. The calcined powder is then press-molded, for example, under the pressure of 1 ton/cm$^2$, then calcined, for example, at 1220° C. for 1 hour, thereby forming multi-component ceramics.

5 Claims, 1 Drawing Sheet

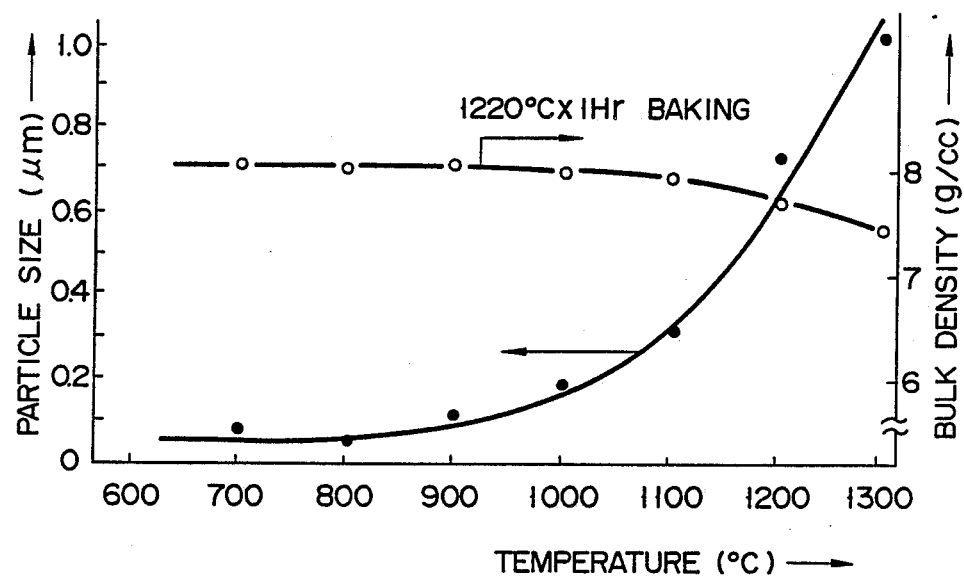

METHOD FOR PRODUCING MULTI-COMPONENT CERAMICS

This is a continuation of application Ser. No. 07/134,083, filed Dec. 17, 1987, abandoned.

BACKGROUND OF THE INVENTION

The present invention relates to a method for producing multi-component ceramics and, more particularly, to a method for readily producing multi-component ceramics to be used as ceramic material or structural ceramic material of high performance.

Sintered ceramics are made of powder, the particles of which have a relatively large diameter (several microns), by mixing and pulverizing raw material powders, molding the powder and then calcining the molded powder. However, the sintered ceramics produced in this manner do not have high density or satisfactory characteristics.

SUMMARY OF THE INVENTION

Accordingly, an object of the present invention is to provide a method for producing multi-component ceramics of high performance, which has high density and is homogeneous.

Another object of the present invention is to provide a method for producing multi-component ceramics which can be easily sintered and can be made into ceramic powder having high bulk density.

Still another object of the invention is to provide a method for readily and reliably producing multi-component ceramics of high performance, which has high density.

According to the present invention, there is provided a method for producing multi-component ceramics, comprising a first step of forming a mixture solution of an amount of one component (X) and a first portion of at least another component (Y) calcining the powder of precipitate removed from the mixture solution at 700° to 1300° C., and forming modified powder made of powder particles each having a diameter of 0.01 to 1.0 micron, a second step of mixing the modified powder made of the calcined mixture, the components of the multi-component ceramic composition, other than components (X) and (Y), and a second portion of the component (Y), and calcining the mixture at 500° to 1300° C., and a third step of molding the resultant mixture and calcining the mixture at 700° to 2000° C.

In the method for producing the ceramics as described above, the powder having a particle size of submicron order, such as 0.01 to 1.0 micron, is obtained in the first step. The powder of the thoroughly mixed components, or a component composition, is obtained in the second step. In other words, powder having the same characteristics as are obtained in the first step can be obtained by adding the second portion of the component (Y) and the components other than the components (X) and (Y). Thus, powder material less expensive can be used than in the case of producing multi-component ceramics in the first step, whereby multi-component ceramics can be produced at low cost. Further, low-temperature baking is performed, whereby the resultant multi-component ceramics can have high bulk density and high quality.

BRIEF DESCRIPTION OF THE DRAWINGS

The accompanying FIGURE shows the relationship between the temperature at which powder was calcined in a second example of the present invention, and the particle diameter and density of the calcined powder.

DETAILED DESCRIPTION OF THE PREFERRED EMBODIMENTS

A method for producing multi-component ceramics, according to the present invention, comprises the following steps:
(a) Forming mixture solution of an amount of one component (X) and a first portion of at least another component (Y), for forming a multi-component ceramic compound.
(b) Forming fine modified powder having a particle diameter of 0.01 to 1.0 micron by forming precipitate or sol containing the above-described components, from the mixture solution, and then calcining the precipitate or the sol at 700° to 1300° C.
(c) Mixing the modified powder, the components of the multi-component ceramic composition, other than components (X) and (Y), and a second portion of the component (Y), and calcining the resultant mixture at 500° to 1300° C.
(d) Forming calcined powder from the mixture obtained in step (c), and calcining the calcined powder at 700° to 2000° C., thereby obtaining multi-component ceramics.

In the method described above, the calcining temperature of the precipitate or the sol is 700° to 1300° C. If the calcining temperature is lower than 700° C., the precipitate or the sol will hardly be agglutinated. If the calcining temperature exceeds 1300° C., the particles will be too large.

After the precipitate or the sol has been calcined, another component is mixed with the precipitate or the sol. The resultant mixture is calcined. This calcining temperature must be above the lowest temperature at which the mixture can have a complete solid-phase and below the highest temperature at which the particles remain to grow remarkably. To meet these requirements, the calcining temperature is 500° to 1300° C. The calcined product obtained in this manner is calcined at 700° to 2000° C. If the temperature is lower than 700° C., the calcined product cannot be sufficiently baked. If the calcining temperature exceeds 2000° C., the particles will grow too large, or the components will volatilize.

Preferred examples will be described, thereby to explain the method for producing multi-component ceramics according to the present invention.

EXAMPLE 1

43.57 cc of aqueous titanium tetrachloride solution (1.3317 1/mol of concentration) and 150 cc of aqueous zirconium oxynitrate (1.145 /1 mol of concentration) were mixed, thus forming an aqueous solution. The aqueous solution was gradually added into one liter of 6N-ammonia solution being stirred, whereby a hydroxide of $Ti^{4+}$ and a hydroxide of $Zr^{4+}$ coprecipitated. The coprecipitate thus obtained was cleaned, dried and calcined at 1100° C., thereby producing $(Ti_{0.2}Zr_{0.8})O_2$ powder.

The mean particle diameter of the powder thus obtained was 0.32 microns.

Then, after 3.5779 g of the powder and 1.4981 g of fine powder of $TiO_2$ (commercially available) were mixed in a ball mill for one day, and the mixture was calcined at 740° for 1 hour thus forming powder $Pb(Zr_{0.5}Ti_{0.5})O_3$. The mean particle diameter of the powder was 0.32 micron.

The calcined powder was press-molded under the pressure of 1 ton/cm$^2$, into tablets. The tablets were calcined at 1220° for 1 hour in lead vapor-oxidizing gas atmosphere. The density of the tablets thus calcined was 7.95. This density was nearly equal to the theoretical value.

The composition of this Example is represented by the general formula of $ABO_3$, i.e., Perovskite compound, where A is an oxygen 12 coordinated metal element, and B is an oxygen 6 coordinated metal element. Element A includes Pb, Ba, Ca, Sr and rare earths such as La. Element B includes, in addition to Zr, for example, Ti, Mg, Sc, Hf, Th, W, Nb, Ta, Cr, Mo, Mn, Fe, Co, Ni, Cd, Al, Sn, As, and Bi.

In the present invention, the molar ratio of the component A to the component B can be either greater or less than 1.0.

To improve the sintering properties and the characteristics of functional Perovskite ceramics, small amounts of assistants are usually added in the first or third step.

The compounds used to produce zirconium solution (aqueous solution or alcoholic solution) include zirconium oxychloride, zirconium oxynitrate, zirconium chloride, zirconium nitride and metallic zirconium.

Reagents used for producing precipitate include, for example, ammonia, ammonium carbonate, caustic alkali, oxalic acid, ammonium oxalate, organic reagents such as amine, oxy, etc.

The types and the quantities of the components of Perovskite which is to be dissolved in the zirconium solution are preferably those which can suppress the agglutination of the zirconia powder obtained eventually by adding the components and which are contained in Perovskite function ceramics. The calcining temperature of the coprecipitate obtained in this manner is 700° to 1300° C. so as to obtain preferable sintered ceramics to obtain powder of particles of 0.01 to 1.0 micron. If the calcining temperature is lower than 700° C., the agglutination will occur. If it exceeds 1300° C., the particles will grow too large.

The calcined powder obtained as described above is mixed with components, except zirconium, added in required amounts. In this case, it is necessary to supplement an amount of the components added to the zirconia, thereby making up for insufficiency. The particle sizes of the compound powders (mainly oxides) are of submicron order. Even if the lead oxide powder containing too large particles is used, it scarcely influences the obtained Perovskite powder.

The calcining temperatures of the mixtures containing Pb, Ba or Sr, or Nb and Ta, largely alter in the range of 500° to 1300° C. In short, the calcining temperature must be above the lowest temperature at which the mixture has a complete solid-phase, and below the highest temperature at which the particles can remain to grow remarkably.

The powder produced as described above is molded and sintered. The sintering temperature depends upon the components, like the calcining temperature of the mixture, and generally falls within a range of 700° to 1700° C. If the sintering temperature is lower than 700° C., the Perovskite containing Pb cannot be sufficiently sintered. If it exceeds 1700° C., the particles will grow too large, or the components will volatilize.

EXAMPLE 2

Experiments were conducted, wherein only the calcining temperature of the coprecipitate of the hydroxide was changed in the steps similar to those of Example 1.

The accompanying drawing shows the mean particle diameter of the product obtained by calcining at 700° to 1300°, which was measured by means of SEM observation, and also shows the density of the sintered ceramics obtained by calcining the mixture at 1220° C. for 1 hour.

EXAMPLE 3

43.57 cc of aqueous titanium tetrachloride solution (1.3317 l/mol of concentration) and 150 cc of aqueous zirconium oxychloride solution (1.146 l/mol of concentration) were mixed, thus forming an aqueous solution. The aqueous solution was left to stand at 100° C. for 100 hours, and subjected to a hydrolytic reaction, thereby producing sol containing $Ti^{4+}$ and $Zr^{4+}$. The sol was cleaned, dried and calcined at 1100° C., thus forming $(Ti_{0.2}Zr_{0.8})O_2$ powder. The mean particle diameter of this powder was 0.32 microns.

Then, 3.5779 g of the calcined powder, 1.4981 g of fine powder of $TiO_2$ all commercially available, and 11.16 g of PbO powder (15 microns in mean particle diameter) were mixed in a ball mill for one day, and then calcined at 740° for 1 hour, thus producing powder of $Pb(Zr_{0.5}Ti_{0.5})O_3$. The mean particle diameter of the powder was 0.32 microns.

The calcined powder thus obtained was press-molded under the pressure of 1 ton/cm$^2$, into tablets. The tablets were sintered at 1220° for 1 hour in lead vaporoxygen coexistent atmosphere. The density of the tablets, thus sintered, was at 7.95, nearly equal to the theoretical value.

COMPARISON EXAMPLE 1

Corresponding to Examples 1 and 3

PbO, $TiO_2$ and $ZrO_2$ powders, all commercially available, were mixed in a ball mill for one day, thereby forming a composition of $Pb(Zr_{0.5}Ti_{0.5})O_3$. This composition was calcined at 850° C. for 2 hours. The calcined powder was molded under the pressure of 1 ton/cm$^2$, and sintered under the same conditions as those in the Example 1, thereby producing ceramics.

The density of the ceramics was approx. 6.5. The mean particle diameter of the powder at calcining was 2.3 microns.

EXAMPLE 4

225 cc of aqueous ferric nitride solution (1.5 l/mol solution) and 180 cc of aqueous sodium niobate (1.2 l/mol solution) were mixed, thus forming an aqueous solution. The aqueous solution was gradually added to one liter of aqueous 6N-ammonia solution being stirred, thus forming hydroxide coprecipitate of $Fe^{3+}$ and $Nb^{5+}$. This coprecipitate was cleaned, dried and calcined at 700° C., thus producing $FeNbO_4$ powder.

1.349 g of $Fe_2O_3$, 1.964 g of $WO_3$ and 28.346 g of PbO, all commercially available, were mixed with 10 g of the calcined powder in a ball mill for one day. The resultant mixture was calcined at 700° C. for 1 hour, thereby producing powder of $0.8(Fe_{1/2}N_{1/2})O_2$-

$0.2Pb(Fe_{2/3}W_{1/3})O_3$. The particle diameter of the calcined powder was 0.3 microns.

The calcined powder thus obtained was press-molded under the pressure of 0.7 ton/cm², into form tablets. The tablets were calcined at 870° C. for 1 hour in the atmosphere. The density of the sintered tablets was 8.1 g/cm³, and the dielectric constant and the dielectric loss in the frequency of 1 kHz were respectively $\epsilon r=10200$ and $\tan \delta=2\%$. The tablets exhibited specific resistance of $1.1 \times 10 \Omega \cdot cm$, and had preferable ceramics characteristics.

EXAMPLE 5

16.23 g of ferric chloride and 27.04 g of niobium chloride were dissolved in one liter of water, thus forming an aqueous solution, which was left to stand at 100° C. for 90 hours. The solution was then subjected to hydrolytic reaction, and made into sol containing $Fe^{3+}$ and $Nb^{5+}$. The sol was cleaned, dried and calcined at 700° C., thus forming $FeNbO_4$ powder. 1.349 g of $Fe_2O_3$, 1.96 g of $WO_3$, and 28.35 g of PbO, all sold in the market, were mixed with 10 g of this powder in a ball mill for one day. The resultant mixture was calcined at 700° for 1 hour, thereby producing powder of $0.8Pb(Fe_{1/2}Nb_{1/2})O_3.0.2Pb(Fe_{2/3}W_{1/3})O_3$. The mean particle diameter of the powder was 0.25 microns.

The calcined powder was under the pressure of 0.7 ton/cm², and calcined at 870° C. for 1 hour in the atmosphere. The density of the product thus obtained was 8.22 g/cm. The dielectric constant and the dielectric loss in 1 kHz were respectively $\epsilon r=10000$ and $\tan \delta=1.5\%$, specific resistance $1.2 \times 10^{10} \Omega \cdot cm$. The product was a material of high quality.

COMPARISON EXAMPLE 2

Corresponding to Examples 4 and 5

General reagents of PbO, $Fe_2O_3$, $Nb_2O_5$ and $WO_3$ powders, all sold in the market, were so weighed, thus preparing $0.8Pb(Fe_{1/2}Nb_{1/2})O_3$-$0.2Pb(Fe_{2/3}W_{1/3})O_3$. 100 g of the weighed powders were mixed in a ball mill for one day. The resultant mixture was calcined at 700° C. for 1 hour, thus forming powder containing 1.5-micron particles. The powder was press-molded under the same conditions as to Examples 4 and 5, and calcined at 870° C. for 1 hour. The controller thus obtained exhibited low bulk specific gravity, and low values of $\epsilon r=5400$, tank $\delta=10\%$, and specific resistance of $7 \times 10^7$. The calcining temperature, at which the density of the material of comparison example 2 was maximum, was 980° C. It was necessary to raise the calcining temperature by 110° C., in comparison with Examples 4 and 5.

EXAMPLE 6

This relates to $(Zr_{0.8}Sn_{0.2})TiO_4$.

43.57 cc of aqueous titanium tetrachloride solution (1.3317 l/mol of concentration) and 150 cc of aqueous zirconium oxynitrate solution (1.146 l/mol of concentration) were mixed. The mixed solution was added to aqueous 6N ammonia solution, thus producing coprecipitate containing $Ti^{4+}$ and $Zr^{4+}$. The coprecipitate was cleaned, dried and calcined at 1100° C., into $(Zr_{0.8}Ti_{0.2})O_2$ powder. This powder had a mean particle diameter of 0.32 microns.

The calcined powder was mixed with 1.9963 g of fine powder of $TiO_2$ and 4.7065 g of $SnO_2$ both commercially available, in a ball mill for one day, thus producing a composition of $(Zr_{0.8}Sn_{0.2})TiO_4$. The composition was calcined at 1000° for 1 hour, thereby forming powder of $(Zr_{0.8}Sn_{0.2})TiO_4$. The mean particle diameter of the powder was 0.36 microns.

The powder thus obtained was molded under the pressure of 1 ton/cm², into tablets. The tablets were sintered at 1450° for 2 hours in the atmosphere. The characteristics of the tablets had the density of 4.94 g/cc, $\epsilon r=36.0$, Q value=5,500.

EXAMPLE 7

This relates to $(Zr_{0.8}Sn_{0.2})TiO_4$.

43.57 cc of aqueous titanium tetrachloride solution (1.3317 l/mol of concentration) and 150 cc of aqueous zirconium oxychloride solution (1.146 l/mol of concentration) were mixed. The mixed solution was left to stand at 100° C. for 100 hours, and subjected to hydrolytic reaction, thereby forming sol containing $Ti^{4+}$ and $Zr^{4+}$. The sol was cleaned, dried and calcined at 1100° C., thus forming $(Zr_{0.8}Ti_{0.2})O_2$ powder. The mean particle diameter of the powder was 0.28 microns.

3.5779 g of the calcined powder was mixed with 1.9963 g of fine powder of $TiO_2$ and 4.7065 g of $SnO_2$ mixed in a ball mill for one day, both commercially available, thereby producing a composition of $(Zr_{0.8}Sn_{0.2})TiO_4$. This composition was calcined at 1000° for 1 hour, thus forming powder of $(Zr_{0.8}Sn_{0.2})TiO_4$. The mean particle diameter of the powder was 0.33 microns.

The calcined powder thus obtained was molded under the pressure of 1 ton/cm³, into tablets. The tablets were sintered at 1450° for 2 hours in the atmosphere. The characteristics of the tablets exhibited a density of 4.97 g/cc, $\epsilon r=37.0$, Q value=6,000.

COMPARISON EXAMPLE 3

Corresponding to Examples 6 and 7

Powders of $ZrO_2$, $SnO_2$ and $TiO_2$ were mixed, in amounts of 9.857 g, 3.014 g and 7.990 g, respectively, in a ball mill for one day, thus producing a composition of $(Zr_{0.8}SnO_2)TiO_4$. The composition was calcined at 1000° C. for 1 hour, thereby forming powder containing 1.5-micron particles. The powder was press-molded under the pressure of 1 ton/cm², and calcined under the same conditions as Examples 6 and 7. Comparison example 3 exhibited a density of 4.22 g/cc, $\epsilon r=27.2$, and Q value=2000.

EXAMPLE 8

Mixed aqueous solution of 1 mol of tetraisopropoxy titanium $(Ti(iso-OC_3H_7)_4)$, 1 mol of tetraethoxysilane $(Si(OC_2H_5)_4)$ and 1.2 liters of ethanol $(C_2H_5OH)$ was produced. 80 ml of 6N hydrochloric acid was dropped while agitating the mixed aqueous solution. The resultant solution was subjected to a hydrolytic reaction, thus preparing silica titania sol solution.

The sol solution was gradually added to aqueous 6N ammonia solution in a ratio of 150 cc into one liter, thereby forming hydroxide coprecipitate of $Ti^{4+}$ and $Si^{4+}$. This coprecipitate was cleaned, dried and nitrated, and reduced in ammonia stream at 1100° for 10 hours, thus producing calcined nitride. The particle diameter of the nitride was 0.1 to 0.3 microns.

Then, the calcined nitride was mixed with 0.41 mol of silicon nitride $(Si_3N_4)$ powder containing 0.8-micron particles, 0.04 mol of spinel $(MgAl_2O_4)$ used as sintering assistant, and 0.025 mol of yttrium oxide $(Y_2O_3)$, thus forming mixed powder.

This powder was mixed with organic solvent and a binder, into a slurry. The slurry was molded in a predetermined shape larger than desired, thereby to make up for shrinkage, degreased at 360°, and sintered at 1750° of the sintered material was polished, thereby forming a test piece of required size.

Table 1 shows various characteristics of the Examples 8 and 9, and the Comparison Example 4.

TABLE 1

| Examples | Composition (mol ratio) TiN | Composition (mol ratio) $Si_3N_4$ | Sintering density (g/cm$^3$) | 3-point bending strength (kg/mm$^2$) | Specific Resistance (Room temp.) ($\Omega \cdot cm$) | Remarks |
|---|---|---|---|---|---|---|
| 8 | 57.5 | 42.5 | 3.78 | 57 | $1.4 \times 10^{-3}$ | Coprecipitate |
| 9 | 57.5 | 42.5 | 3.76 | 54 | $1.6 \times 10^{-3}$ | Sol gel |
| C. 4 | ↑ | ↑ | 3.71 | 43 | $2.5 \times 10^{-3}$ | Comparison |

C. for 4 hours in nitrogen atmosphere. Then, the surface of the sintered material was polished, thus forming a test piece of required size.

EXAMPLE 9

Mixed aqueous solution of 1 mol of tetraisopropoxy titanium ($Ti(iso-OC_2H_7)_4$), 1 mol of tetraethoxysilane ($Si(OC_2H_5)_4$) and 1.2 liters of ethanol ($C_2H_5OH$) was produced. 80 ml of 6N hydrochloric acid was dropped into this solution while agitating the mixed aqueous solution. The resultant solution was subjected to a hydrolytic reaction, thereby preparing silica titania sol solution. This sol solution was geled at 50° C., and dried for 3 days. Silica titania gel obtained in this manner was nitrated and reduced in ammonia stream at 1100° C. for 10 hours, thus producing calcined nitride. The particle diameter of the calcined nitride was 0.05 to 0.3 microns.

Then, the calcined nitride was mixed with 0.41 mol of silicon nitride ($Si_3N_4$) powder containing 0.8 micron of mean particle diameter, 0.04 mol of spinel ($MgAl_2O_4$) used as sintering assistant, and 0.025 mol of yttrium oxide ($Y_2O_3$), thereby preparing mixed powder.

This powder was mixed with organic solvent and a binder, into a slurry. The slurry was molded in a predetermined shape larger than required to components for shrinkage, degreased at 360°, and sintered at 1750° C. for 4 hours in nitrogen atmosphere. Then, the surface of the sintered material was polished, thus forming a test piece of required size.

COMPARISON EXAMPLE 4

Corresponding to Examples 8 and 9

In Examples 8 and 9, the component ratio of TiN and $Si_3N_4$ of the final sintered ceramics was analyzed, and the result exhibited by molar ratio "TiN:$Si_3N_4$=57.5:42.5". For comparison, a test piece was produced by the known method, which had the same composition as that of Examples 8 and 9.

Predetermined amounts of silicon nitride containing 0.8-micron (mean particle diameter) particles and titanium nitride containing 0.5-micron (mean diameter) particles were weighed, thus preparing mixture powder of composition of 41 mol % of silicon nitride and 55.4 mol % of titanium nitride. 2.2 mol % of $MgAl_2O_4$ and 1.4 mol % of $Y_2O_3$ of sintering assistant were mixed with the mixture powder.

This powder was mixed with an organic solvent and a binder, into a slurry. The slurry was molded in a predetermined shape larger than required to compensate for shrinkage, degreased at 360°, and sintered at 1750° C. for 4 hours in nitrogen atmosphere. Then, the surface Examples 1, 2, 4, 6 and 8 were made by a method using neutral coprecipitate. Examples 3, 5, 7 and 9 were made by a method wherein aqueous chloride solution and mixed alkoxide solution were hydrolytically decomposed for producing fine powder, or natured powder containing particles having a diameter of 0.01 to 1.0 micron.

Additional methods are available: (1) high-temperature, high-pressure hydrolytic method at 120° to 200° C.; several atoms; (2) alkoxide hydrolytic method; (3) hydroxidizing method for producing fine oxide powder from metal powder at high temperature 400° to 700° C. and under high water pressure (1000 atoms of reagent); and (4) method for producing powder by evaporating and drying mixed solution of metallic salt and thermally decomposing it at high temperature (e.g., a spraying drying method, a freezing drying method, an organic fiber impregnating thermally decomposing method, alkoxide thermal decomposing method, etc.) in a vacuum vessel or in vapor state method as adapted for the method for producing fine powder in these steps.

OTHER EXAMPLES

Additionally, the following multi-component compositions were improved in various characteristics by enhancing the density to the values similar to those of Examples 1-9.

Piezoelectric porcelains $0.8Pb(Ti_{1/2}Zr_{1/2})O_3-0.2Pb(Mg_{1/3}Nb_{2/3}))3$
$0.8Pb(Ti_{1/2}Zr_{1/2})O_3-0.2Pb(Y_{1/2}Nb_{1/2})O_3$ Transparent porcelains $0.022(Pb_{0.91}La_{0.09}).0.978(Zr_{0.65}Ti_{0.35})O$
$0.022(Pb_{0.95}Ba_{0.05}).0.978(Zr_{0.53}Ti_{0.47})O$
$0.022(Pb_{0.95}Sr_{0.05}).0.978(Zr_{0.53}Ti_{0.47})O$
$0.022(Pb_{0.91}Bi_{0.09}).0.978(Zr_{0.65}Ti_{0.35})O$
$0.022(Pb_{0.91}La_{0.09}).0.978(Hf_{0.65}Ti_{0.35})O$
Antiferrodielectric $PbZrO_3$ Semiconductor capacitor $(Sr_xBa_gCa_z)TiO_3$ $(x+y+z=1)$ Resonator porcelains $(Sr_{0.73}Ba_{0.27})(Zr_{0.973}Ti_{0.027})O_3$ $Ba(Zn_{0.33}Nb_{0.53}Ta_{0.13})O_3$
$Ba(Zn_{1/3}Nb_{2/3})O_3$ $BaTi_4O_9$ PCT Porcelain $(Ba_{0.999}Y_{0.001})TiO_3$ Magnetic material $BaO.6Fe_2O_3 + 3$ mol % $ZrO_2$
$NiO.Fe_2O_3$ Low expansion material $ZrTiO_4$ Alumina porcelains $0.8Al_2O_3 0.2(0.95ZrO_2-0.005Y_2O_3)$
$0.08Al_2O_3-0.02(3Y_2O_3.5Al_2O_3)$ Zirconia Porcelain $0.95ZrO_2-0.05Y_2O_3$ Conductive material $0.27TiN-0.73AlN$ Conductive material $0.25TiC-0.75SiC$ Substrate $0.975AlN-0.025Y_2O_3$ Substrate $0.975AlN-0.025Y_2O_3$
$0.51Al_2O_3-0.35SiO_2-0.14PbO$

What is claimed is:

1. A method of producing $Pb(Zr_{0.5}Ti_{0.5})O_3$, comprising the steps of:
   (1) adding an aqueous solution containing a titanium component to a solution containing a zirconium component; wherein the zirconium component is added in an amount necessary for producing said $Pb(Zr_{0.5}Ti_{0.5})O_3$ and a first portion of the titanium component is added in an amount which is not sufficient for producing said $Pb(Zr_{0.5}Ti_{0.5})O_3$;
   (2) adding the solutions in step (1) to a coprecipitate forming solution to form a coprecipitate containing the zirconium and titanium components from the solutions;
   (3) calcining the coprecipitate at a temperature of 700° to 1300° C., to form a fine modified powder made of particles having a diameter of 0.01 to 1.0 micron; and
   (4) mixing the powder produced in step (3) with a second portion of a titanium component and powders of components of the $Pb(Zr_{0.5}Ti_{0.5})O_3$ composition other than Zr and Ti; calcining the mixture at a temperature of 500° to 1300° C., to produce a calcined powder of a multi-component ceramic composition, and
   (5) molding the calcined powder and sintering the molded mixture at a temperature of 700° to 2000° C.

2. A method according to claim 1, wherein the zirconium component is an aqueous zirconium solution, the first portion of the titanium component is an aqueous titanium tetrachloride solution, and the second portion of the titanium component contains $TiO_2$.

3. A method according to claim 2, wherein the aqueous zirconium solution is formed from a compound selected from the group consisting of zirconium oxychloride, zirconium oxynitrate, zirconium chloride, zirconium nitride or metallic zirconium.

4. A method according to claim 1, wherein said coprecipitate-forming solution is ammonia water.

5. A method of producing $Pb(Zr_{0.05}Ti_{0.5})O_3$, comprising the steps of:
   (1) adding an aqueous solution containing a titanium component to a solution containing a zirconium, thereby forming a sol containing the components titanium and zirconium from the solutions, wherein the zirconium component is added in an amount necessary for producing said $Pb(Zr_{0.5}Ti_{0.5})O_3$, and a first portion of the titanium component, is added in an amount not sufficient for producing said $Pb(Zr_{0.5}Ti_{0.5})O_3$;
   (2) calcining the sol at a temperature of 700° to 1300° C., to form a fine modified powder made of particles having a diameter of 0.01 to 1.0 micron;
   (3) mixing the modified powder produced in step (2) with a powder of a second portion of a titanium component and powders of components of the $Pb(Zr_{0.5}Ti_{0.5})O_3$ composition, other than zirconium and titanium, calcining the mixture at a temperature of 500° to 1300° C., to produce a calcined powder of multi-component ceramic composition; and
   (4) molding the calcined powder of step (3) and sintering the at a temperature of 700° to 2000° C.

* * * * *